M. O. SPURGEON.
MARSHMALLOW TOASTING MACHINE.
APPLICATION FILED JAN. 8, 1914.
1,111,870.
Patented Sept. 29, 1914.
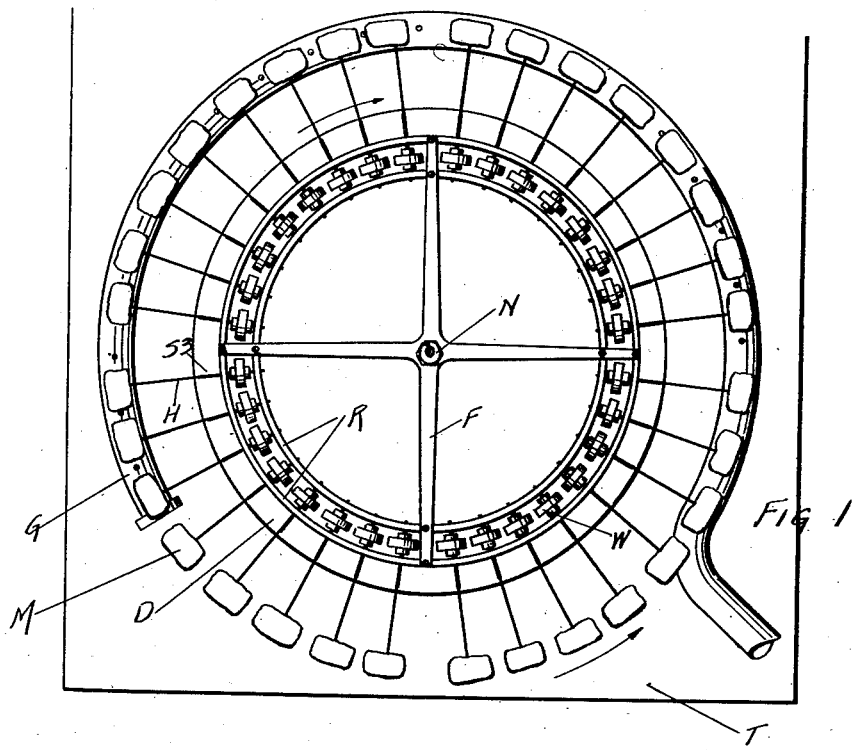
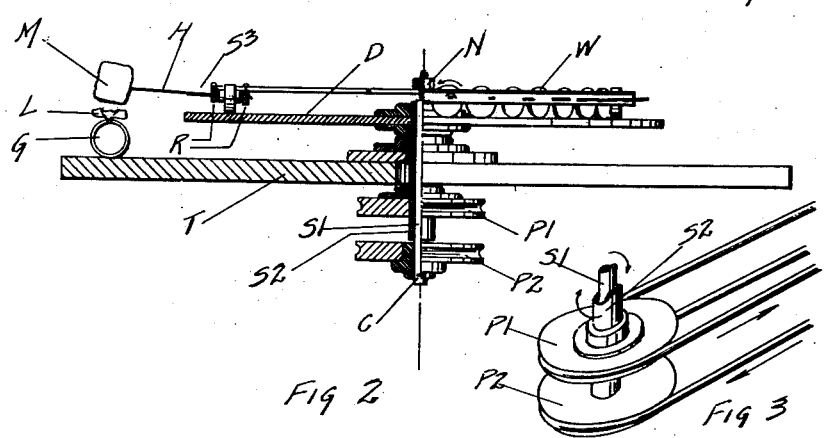

UNITED STATES PATENT OFFICE.

MATTHIAS O. SPURGEON, OF VANCOUVER, WASHINGTON.

MARSHMALLOW-TOASTING MACHINE.

1,111,870.   Specification of Letters Patent.   Patented Sept. 29, 1914.

Application filed January 8, 1914. Serial No. 810,996.

*To all whom it may concern:*

Be it known that I, MATTHIAS O. SPURGEON, a citizen of the United States, residing at 1001 Main street, in the city of Vancouver, in the county of Clark and State of Washington, have invented certain new and useful Improvements in Marshmallow-Toasting Machines, of which the following is a clear and exact specification.

My invention relates to improvements in a candy toasting machine in which a horizontal revolving disk operating in conjunction with a series of small rotating rollers, carries the material being toasted in a progressing rolling motion over flame.

The objects of my improvements are,—first, to provide a continuously revolving device for holding candies in position for toasting; second, to provide for the proper adjustment of the holding spindles to a flame.

I attain the objects by means of the mechanism illustrated in the accompanying drawing, in which similar letters refer to similar parts in the several views.

Figure 1. is a plan view of the machine complete as it appears in use; Fig. 2. is a half sectional and half front elevation of the complete machine; Fig. 3. is a detailed view of the driving mechanism showing the method of producing the reverse motions.

T. is the supporting table, or plate to which the machine is secured by means of the base, on which rotates the hollow shaft $S^2$. to the upper end of which is secured the disk D. which is rotated in the desired direction by means of the driving pulley $P^1$. secured to the lower end of $S^2$.

$S^1$. is a solid shaft passing through $S^2$. by means of which rotation is given to the roller carrying frame composed of the parts F. and R. R. secured to the upper end of $S^1$.

Suitably spaced between the rings R. R. of the holding frame are placed the candy holder rotating rollers W. which are caused to rotate in the desired direction and at the proper speed by being brought in contact with the upper surface of the rotating disk D.

$S^3$. forming the axis for the rollers W. and extended beyond the outer ring R. forms a support for the candy holder H.,—H. being adjustable in or upon $S^3$.

G. is a pipe through which gas is supplied for the toasting operation.

The design of the machine is such as to permit its operation to be continuous.

Having thus described my invention, what I claim as new and on which I desire Letters Patent is:—

A candy toasting machine, the combination of a circular burner, an adjustable candy holder, double rotating mechanism for carrying the candy holder adjacent to and in a circle corresponding to that described by the burner and for rotating said candy holder on its own axis.

MATTHIAS O. SPURGEON.

Witnesses:
W. E. EDDY,
C. E. BARNES.